C. W. FILLMORE.
Vehicle-Spring.
No. 208,901. Patented Oct. 15, 1878.
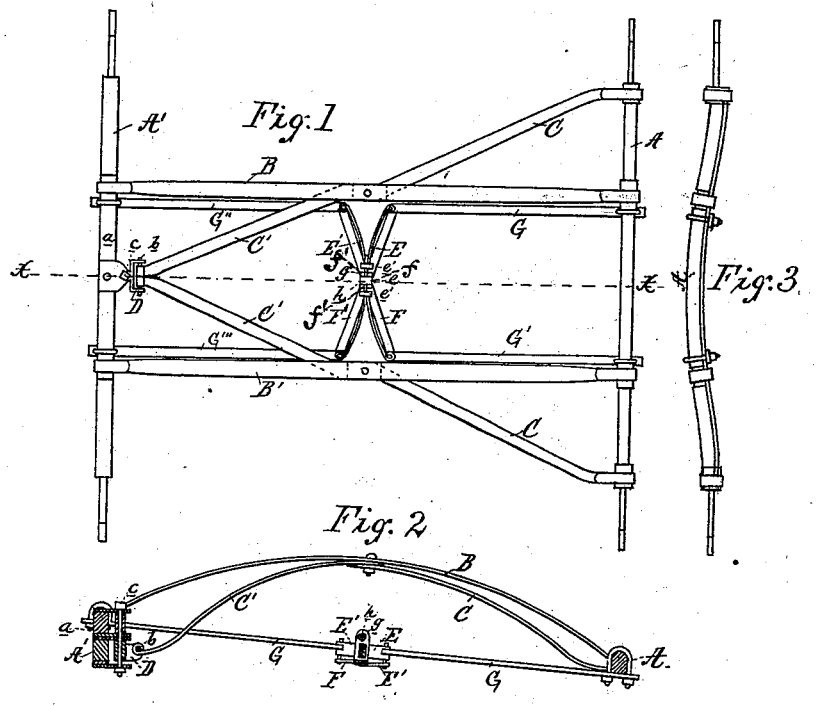
Witnesses
G. R. Hoffman
George P. Barton
Inventor
Charles W. Fillmore
By Gridley & Co.
Attys.

UNITED STATES PATENT OFFICE.

CHARLES W. FILLMORE, OF MARENGO, ILLINOIS.

IMPROVEMENT IN VEHICLE-SPRINGS.

Specification forming part of Letters Patent No. 208,901, dated October 15, 1878; application filed August 15, 1878.

*To all whom it may concern:*

Be it known that I, CHARLES W. FILLMORE, of Marengo, in the county of McHenry and State of Illinois, have invented certain new and useful Improvements in Vehicle-Springs; and I do hereby declare the following to be a clear, full, and exact description thereof, which will enable others skilled in the art to which my invention appertains to make and use the same, reference being had to the accompanying drawings, forming part of this specification, in which—

Figure 1 represents a plan or top view embodying my invention. Fig. 2 represents a longitudinal section at line $x\,x$, Fig. 1. Fig. 3 represents an end view, showing the curvature of the rear axle.

Like letters of reference indicate like parts.

The object of my invention is, first, to regulate the flexibility of the springs according to the load placed upon them, to distribute equally the load placed upon the springs; and, second, to provide a flexible reach or perch for the purpose of easing the jarring of the vehicle when traveling over rough roads or striking against obstructions.

In the drawing, A A' represent the axle. $a$ is the rocker-bar, to the under side of which the front axle, A, is pivoted. B B' are semi-elliptical leaf-springs, which may be made of one or more leaves, preferably of steel, extending equidistant from the rear axle, A', to the rocker-bar $a$, and are looped and secured at right angles to the axle A and rocker-bar $a$, respectively. E E' are auxiliary springs, preferably of steel, and act in conjunction with the main springs B B', and any thrust received by the main springs B B' will be eased or cushioned by the auxiliary springs E E'.

The auxiliary springs E E' are riveted together or clamped midway by means of a clamp, $e$, and their eye ends are pivoted to the inner ends of the reach or perch bars G G' G'' G''', and also to the ends of the equalizing-bars F F'.

F F' are equalizing-bars, intersected at and pivoted through their centers to the under side of clamp $e$, and pivoted at their ends to the inner ends of the perch or reach bars G G' G'' G''', as shown. The equalizing-bars F F' are for the purpose of distributing and equalizing the strain that may come on any one portion of the springs B B', and cause them to rise and settle together equally.

G G' are reach or perch bars, extending from the rear axle, A', to which they are secured, to the eye ends of the auxiliary spring E, to which they are pivoted. G'' G''' are also reach or perch bars extending from the rocker $a$, to which they are secured, to the eye ends of the auxiliary spring E', to which they are pivoted. $e'\,e'$ are sockets of clamps bearing against and surrounding the springs E E', as shown, and are movable in the direction of the length of the springs E E'. $h$ is a nut firmly connected to spindle $g$, and is for the purpose of rotating the same.

The top of the clamp $e$ is provided with a slot, $f$, and semi-journals $f'\,f''$, which are for the purpose of receiving nut $h$ and spindle $g$, the ends of which are screw-threaded right and left, respectively. On either side of clamp $e$ are smaller clamps or sockets $e'\,e'$, surrounding the springs E E', and are provided with screw-threaded holes, threaded right and left, respectively, to receive spindle $g$.

It will be observed that, by rotating the nut and spindle, the clamps or sockets $e'\,e'$ are moved either from or toward the center of the springs E E', thereby regulating the amount of support the auxiliary springs E E' shall render by the equal opening and closing of both ends of the aforesaid springs.

It will also be observed that the gearing-frame is flexible in the direction of its length, allowing the wheels to adapt themselves more or less to the uneven surface of the ground, and also ease any jar which the vehicle may be subjected to in the event of running against obstructions.

I do not confine myself to the construction as shown and described, for I sometimes make the springs separate from the vehicle by connecting the ends of the springs B B' directly to the reach or perch bars G G' G'' G''', when the springs may be used in connection with a vehicle already provided with a reach or perch.

Having thus described my invention, what I claim as new, and desire to secure by Letters Patent, is—

1. The combination, with the rocker-bar $a$, axle A, and springs B B', of the auxiliary springs E E' and reach or perch bars G G' G'' G''', substantially as and for the purpose specified.

2. The combination, with the springs E E', provided with sockets $e'$ $e'$, spindle $g$, and nut $h$, of the equalizing-bars F F', substantially as and for the purpose specified.

3. The combination, with the auxiliary springs E E', of the equalizing-bars F F', substantially as and for the purpose specified.

CHAS. W. FILLMORE.

Witnesses:
GEORGE P. BARTON,
G. R. HOFFMAN.